N. H. HOLLAND.
TELEPHONE TRANSMITTER.
APPLICATION FILED MAY 13, 1913.
1,226,886.
Patented May 22, 1917.
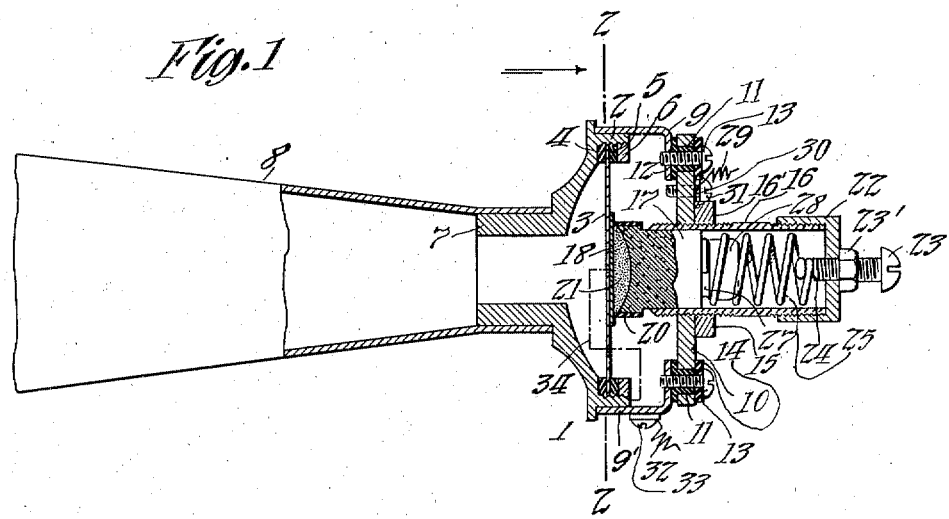
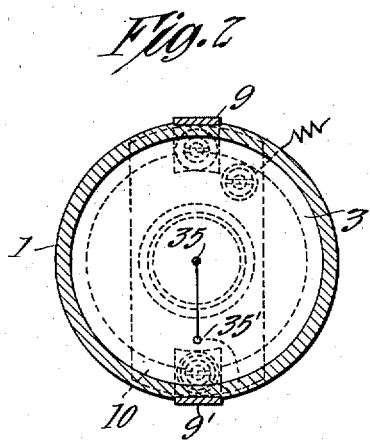
Witnesses:
Inventor:
Newman H. Holland
by Dyer & Holden
his Attys.

UNITED STATES PATENT OFFICE.

NEWMAN H. HOLLAND, OF WEST ORANGE, NEW JERSEY, ASSIGNOR, BY MESNE ASSIGN-
MENTS, TO NEW JERSEY PATENT COMPANY, OF WEST ORANGE, NEW JERSEY, A
CORPORATION OF NEW JERSEY.

TELEPHONE-TRANSMITTER.

1,226,886.  Specification of Letters Patent.  Patented May 22, 1917.

Application filed May 13, 1913. Serial No. 767,261.

*To all whom it may concern:*

Be it known that I, NEWMAN H. HOLLAND, a subject of the King of Great Britain, and a resident of West Orange, in the county of Essex and State of New Jersey, have invented a certain new and useful Improvement in Telephone-Transmitters, of which the following is a description.

My invention relates to telephone transmitters and more particularly to microphone transmitters wherein the desired variations in current are produced by variations in electrical resistance caused by varying the pressure upon a quantity of finely divided or granular conductive material, such as carbon, which is included between electrodes in the circuit carrying the current, the requisite changes in pressure being effected between the electrodes and the granular material by a diaphragm or other means adapted to be set into vibration by the sound waves from a source of sound, such as the human voice.

Heretofore it has been customary to have the granular material in the transmitter in a free loose state, the result being that with transmitters of the type in question, as heretofore made, the individual particles of the granular material move relatively to each other during the vibration of the diaphragm to a considerable extent, and objectionable noises are consequently produced when the electrical impulses on the telephone circuit are converted into sound waves by the telephone receiver. When the electric impulses produced on said circuit by such transmitters are employed to operate a phonograph recorder to form a phonograph record, the record thus formed is filled with defects which produce foreign and unpleasant surface noises when the record is reproduced and make the said record commercially unsatisfactory. One of the objects of my invention is to overcome these defects; and I do so by providing means whereby the granular conductive material is so packed in between the electrodes of the transmitter that relative movement of the individual particles thereof during the vibration of the diaphragm is practically impossible, the granular condition of the said material, however, permitting the same to so adjust itself that it lies in intimate contact with the electrodes.

In accordance with my invention, one of the electrodes of my improved transmitter is preferably made movable or adjustable relatively to the other so that the desired initial pressure between the electrodes and the granular material may be readily obtained, another object of my invention being to provide means, such as a compression spring, coacting with the adjustable electrode, to automatically maintain said pressure at the desired amount. Means are also provided whereby the pressure of the spring or its equivalent may be regulated at will.

A further object of my invention is to provide means for resisting movement or vibration of the said movable or adjustable electrode by rapid vibrations, such as those produced upon the diaphragm by sound waves, the electrode in question acting during the vibration of the diaphragm substantially as if it were stationary but being movable by the spring or its equivalent to produce the desired initial pressure. Other objects of my invention will appear more fully in the following specification and appended claims.

In order that my invention may be more clearly understood, attention is hereby directed to the accompanying drawing forming a part of this specification and in which—

Figure 1 is a central longitudinal sectional view partly in elevation of the preferred embodiment of my invention;

Fig. 2 is a cross section thereof taken on the line 2—2 of Fig. 1.

Referring to the drawings, the numeral 1 designates a metallic sound box having an arched body portion from which extends an annular flange 2 within which the diaphragm 3, preferably formed of mica or other suitable material, is mounted. The periphery of the diaphragm is secured between gaskets 4 and 5, formed of rubber or other suitable yielding material, the said gaskets being securely held between the sound box body and a metallic ring 6 threaded into the interior of the flange 2. A hollow neck 7 extends centrally from the sound box and has secured to the same the tapering mouth piece 8 by means of which the sound waves from the person speaking or other source of sound are caused to converge into the sound box body and set the diaphragm into vibration.

Referring more particularly to the features of my improved device wherein my invention resides, metallic arms or brackets 9 and 9' secured to the flange 2 at diametrically opposite positions thereon serve as a support for a bridge bar 10. The latter is secured at each end to one of the arms or brackets 9 or 9'. The means for securing each end of the bridge bar to the adjacent bracket comprise an insulating bushing 11 extending through an opening in the bar 10 and having a flange-like portion interposed between the said bar and the horizontal portion 12 of the bracket, and a screw 13 passing through the bushing and also through an insulating washer 14 interposed between the head of the screw and the bridge bar, the screw being threaded into the part 12. By means of the above described connection between the arms or brackets 9 and 9' and the bridge bar 10, the latter is completely insulated from the former. A metallic sleeve or guide 16 is threaded through a central opening in the bridge bar 10 and is arranged in axial alinement with the center of the diaphragm and the sound box neck 7. A lock nut 16' is employed to hold the sleeve 16 in proper adjustment with respect to the diaphragm. Slidable longitudinally within the sleeve or guide 16 is a carbon electrode 17; and secured to the diaphragm opposite said electrode is a second electrode 18, formed preferably of a thin circular sheet of carbon of a diameter slightly greater than that of the electrode 17, the electrode 18 being movable toward and away from the electrode 17 by the vibration of the diaphragm. The face of the electrode 17 is arranged closely adjacent the electrode 18 and is preferably of curved concave form so as to form between the two electrodes, a pocket or cell, the latter being completely inclosed around its periphery by an annular member 20 of yielding insulating material, such as cotton fabric, which annular member is secured to the periphery of the electrode 17 and bears against the face of the electrode 18. A thin layer 21 of granular or finely divided carbon is placed within the cell made as described above. The outer end of the sleeve 16 is closed by a cap 22 threaded on the periphery of said sleeve. A screw 23 is threaded through the center of said cap and is provided at its inner end with an annular groove 24 within which an end of the coil spring 25 is rotatably secured, the opposite end of the spring engaging within a circular groove 27 formed in the head or projection 28 of the electrode 17. With this construction, the spring 25 acts to constantly press the electrode 17 against the granular material with a predetermined initial pressure and the said material completely fills and is packed within the cell formed by the electrodes and the part 20 so that the objectionable individual movements of the carbon particles hereinbefore referred to are effectively prevented. The set screw 23 may obviously be adjusted at will to obtain the desired initial degree of pressure of the spring 25. A lock nut 23' serves to lock the set screw 23 in adjusted position. The cap 22 has an air tight connection with the sleeve 16 and the electrode 17 fits closely within the latter so that these parts together constitute a dash-pot which, while permitting slow movement of the electrode 17 whereby the latter may adjust itself to place the desired initial pressure on the finely divided carbon, acts pneumatically to prevent rapid vibration of said electrode such as would be produced by the vibration of the diaphragm. The inner end of the adjustable sleeve 16 coacts with a shoulder formed on the inner end portion of the electrode 17 to so limit the movement of the latter away from the electrode 18 as to prevent the escape of the granular material 21 from between the electrodes. A lead wire 29 is secured between bridge member 10 and a washer 30 by means of a screw 31, this lead wire thereby having an electrical connection with the electrode 17 through the electrically conductive bridge bar and sleeve 16. Electrical connection is made with the electrode 18 by means of a wire 32 which is secured in electrical connection with arm 9' by screw 33, the electrode 18 being placed in electrical connection with said arm by means of a wire or conductor 34 passing through small openings 35 and 35' in the diaphragm and suitably secured at one end to the said electrode and at the other end to the sound box body from which the current is conveyed to the arm 9'.

Many modifications may obviously be made in the specific structure herein described without departing from the spirit of my invention and I wish, therefore, not to be limited to the exact details herein disclosed.

What I claim as new and desire to protect by Letters Patent is as follows:

1. In a microphone transmitter, the combination of an electrode arranged to vibrate in accordance with pulsations transmitted thereto, a second electrode movable relatively to said first named electrode, granular conductive material between said electrodes, means pressing said second electrode toward said first named electrode to compress said material between said electrodes, and pneumatic means tending to prevent vibration of said second electrode upon the vibration of said first named electrode, substantially as described.

2. In a microphone transmitter, the combination of an electrode arranged to vibrate in accordance with pulsations transmitted thereto, a second electrode movable relatively to said first named electrode, granular conductive material between said electrodes, means pressing said second electrode toward said first named electrode to compress said material between said electrodes, and means coacting with said second electrode to form a pneumatic dash pot tending to prevent vibration of said second electrode by the vibration of said first electrode, substantially as described.

3. In a microphone transmitter, the combination of an electrode arranged to vibrate in accordance with sound waves, a second electrode movable toward and away from said first named electrode, granular conductive material between said electrodes, and pneumatic means for preventing vibrations of said second electrode by the vibration of said first named electrode, substantially as described.

4. In a microphone transmitter, the combination of an electrode arranged to vibrate in accordance with pulsations transmitted thereto, a second electrode movable relatively to said first named electrode, and means coacting with said second electrode to form a pneumatic dash pot for preventing vibration of said second electrode by the vibration of said first named electrode, substantially as described.

5. In a microphone transmitter, the combination of an electrode arranged to vibrate in accordance with pulsations transmitted thereto, a second electrode movable relatively to said first named electrode, one of said electrodes having a pocket or cell extending close to the other electrode, granular conductive material filling said pocket or cell, means coacting with said electrodes to prevent individual movement of the particles of said material upon the vibration of said first electrode, and pneumatic means tending to prevent vibration of said second electrode by the vibration of the first electrode, substantially as described.

6. In a microphone transmitter, the combination of an electrode arranged to vibrate in accordance with pulsations transmitted thereto, a second electrode movable relatively to said first named electrode, yielding insulating means coacting with said electrodes from an inclosed cell, granular conductive material within said cell, means pressing said second electrode toward said first named electrode to pack said material in said cell, and pneumatic means tending to prevent vibration of said second electrode by the vibration of said first electrode, substantially as described.

7. In a microphone transmitter, the combination of an electrode arranged to vibrate in accordance with pulsations transmitted thereto, a second electrode movable relatively to said first named electrode, and yielding insulating means coacting with said electrodes to form an inclosed cell, granular conductive material within said cell, means pressing said second electrode toward said first named electrode to pack said material in said cell, means for regulating the pressure of said pressing means, and pneumatic means tending to prevent vibration of said second electrode by the vibration of said first electrode, substantially as described.

8. In a microphone transmitter, the combination of an electrode arranged to vibrate in accordance with pulsations transmitted thereto, a second electrode movable relatively to said first named electrode, yielding insulating means coacting with said electrodes to form an inclosed cell, granular conductive material within said cell, means pressing said second electrode toward said first named electrode to pack said material in said cell, and means coacting with said second electrode to form a pneumatic dash pot tending to prevent vibration of said second electrode by the vibration of said first electrode, substantially as described.

9. In a device of the class described, an electrode arranged to vibrate in accordance with pulsations transmitted thereto, a second electrode movable relatively to said first named electrode, yielding insulating means coacting with said electrodes to form an inclosed cell, granular conductive material filling said cell, means pressing said second electrode toward said first named electrode, and pneumatic means tending to prevent vibration of said second electrode, substantially as described.

10. In a device of the class described, an electrode arranged to vibrate in accordance with pulsations transmitted thereto, a second electrode movable relatively to said first named electrode, yielding insulating means coacting with said electrodes to form an inclosed cell, granular conductive material filling said cell, means pressing said second electrode toward said first named electrode, and means coacting with said second electrode to form a pneumatic dash-pot tending to prevent vibration of said second electrode, substantially as described.

11. In a device of the class described, the combination of a sound box, an electrode supported thereby, a bridge on said sound box, a guide supported by said bridge, a second electrode movable in said guide, said guide being adjustable and coacting with said second electrode to limit the movement thereof in one direction, granular conductive material between said electrodes, and means tending automatically to move said second electrode toward the other electrode, substantially as described.

12. In a device of the class described, the combination of a vibratory electrode comprising a diaphragm, a sound box supporting said diaphragm with one side of the diaphragm open to the atmosphere, a second electrode movable relatively to said first named electrode, means pressing said second electrode toward said first named electrode, and pneumatic means arranged on the side of the diaphragm open to the atmosphere tending to prevent vibration of said second electrode, substantially as described.

13. In a microphone transmitter, the combination of an electrode arranged to vibrate in accordance with pulsations transmitted thereto, a second electrode movable relatively to said first named electrode, and pneumatic means for preventing vibrations of said second electrode, substantially as described.

14. In a device of the class described, an electrode arranged to vibrate in accordance with pulsations transmitted thereto, a second electrode movable toward and away from said first named electrode, granular conductive material between said electrodes, and a support for said second electrode, said support coacting with said second electrode to limit the movement of the latter away from the first electrode to thereby prevent the escape of said granular material from between said electrodes, substantially as described.

15. In a device of the class described, an electrode arranged to vibrate in accordance with pulsations transmitted thereto, a second electrode movable relatively to said first named electrode, means coacting with said second electrode to form a dash-pot tending to prevent vibration of said second electrode, and means within said dash-pot pressing said second electrode toward said first electrode, substantially as described.

This specification signed and witnessed this 8th day of May, 1913.

NEWMAN H. HOLLAND.

Witnesses:
FREDERICK BACHMANN,
MARY J. LAIDLAW.

It is hereby certified that in Letters Patent No. 1,226,886, granted May 22, 1917, upon the application of Newman H. Holland, of West Orange, New Jersey, for an improvement in "Telephone-Transmitters," an error appears in the printed specification requiring correction as follows: Page 3, line 51, claim 6, for the word "from" read *to form;* and that the said Letters Patent should be read with this correction therein that the same may conform to the record of the case in the Patent Office.

Signed and sealed this 20th day of November, A. D., 1917.

[SEAL.]
R. F. WHITEHEAD,
*Acting Commissioner of Patents.*

Cl. 179—124.